(12) United States Patent
El Asmar et al.

(10) Patent No.: US 11,463,223 B2
(45) Date of Patent: Oct. 4, 2022

(54) EFFICIENT DECODING OF REPETITION DATA

(71) Applicant: Sequans Communications S.A., Colombes (FR)

(72) Inventors: Karim El Asmar, Colombes (FR); Elena Florian, Colombes (FR); Moussa Abdi, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 136 days.

(21) Appl. No.: 16/588,396

(22) Filed: Sep. 30, 2019

(65) Prior Publication Data

US 2021/0099262 A1 Apr. 1, 2021

(51) Int. Cl.
*H04L 5/00* (2006.01)
*H04L 1/00* (2006.01)
*H04B 17/336* (2015.01)
*H04W 72/04* (2009.01)
*H04W 24/08* (2009.01)

(52) U.S. Cl.
CPC ............ *H04L 5/006* (2013.01); *H04B 17/336* (2015.01); *H04L 1/0026* (2013.01); *H04L 1/0053* (2013.01); *H04W 24/08* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2018/0279315 | A1* | 9/2018 | Salem | H04L 1/0003 |
| 2019/0036647 | A1* | 1/2019 | Gowda | H04W 52/0229 |
| 2021/0036807 | A1* | 2/2021 | Iwai | H04L 1/1896 |
| 2021/0105719 | A1* | 4/2021 | Thangarasa | H04W 68/005 |
| 2021/0159952 | A1* | 5/2021 | Nunome | H04W 16/28 |

OTHER PUBLICATIONS

Panasonic "eMTC PDSCH Symbol Level Combining for CE Mode B," 3GPP TSG RAN WG1 Meeting #83, Anaheim, California, USA, Nov. 15-22, 2015.

* cited by examiner

*Primary Examiner* — Ajit Patel
*Assistant Examiner* — Pamit Kaur
(74) *Attorney, Agent, or Firm* — Hamilton, Brook, Smith & Reynolds, P.C.

(57) ABSTRACT

A method for receiving repeated transmission of portions of data from a transmitter, the method comprising at a processor of a receiver, deriving a metric indicative of a desired PER of the received repeated portions of data, based on the desired PER of the received repeated portions of data at the receiver, deriving an optimal number of repetitions of each portion of the data to be received for successful decoding, wherein when the optimal number of repetitions have been received, decoding is to be activated; and further wherein the optimal number of repetitions is derived such that power consumption to successfully decode the data is minimized at the receiver.

18 Claims, 5 Drawing Sheets

EFFICIENT DECODING OF REPETITION DATA

TECHNICAL FIELD

This invention relates to efficient decoding of data transmitted repeatedly. It is particularly suitable for, but by no means limited to, LTE Cat-M devices.

BACKGROUND

In machine type communication (MTC) applications, power consumption is critical for LTE user equipment (UE) devices. Such devices are often deployed at a large scale in remote or underground locations which makes replacing their batteries both expensive and difficult due to limited accessibility. Moreover, these devices are, typically, only occasionally triggered for data transmission and/or reception. For example, a smart meter device communicating energy consumption once a day. In order to minimize device power consumption, it is important to limit their wake-up time whenever they are active.

A typical example of a long period of inactivity for LTE receivers is discontinuous reception (DRX and eDRX). This is where the device sleeps for a pre-defined duration (up to several hours or days) before waking up at the end of the cycle to check whether data must be received. Here, to aid reception in areas of limited coverage, the concept of packet repetitions was introduced by 3GPP for both the MTC physical downlink control channel (MPDCCH) and the Physical Downlink Shared Channel (PDSCH). Packets are re-transmitted across transmission time intervals (TTI), or subframes, of 1 ms and can be combined by the receiver to improve successful reception rates.

Taking Cat-M1 user equipment (UE) as an example, up to 2048 repetitions can be transmitted in coverage enhancement mode B (CEModeB) for PDSCH. As would be understood, the receiver performs hybrid automatic repeat request (HARQ) combining to exploit these repetitions, followed by turbo decoding (TDC), and if successful (a positive redundancy check), the UE can then go back to sleep.

While the UE knows in advance how many repetitions were transmitted by the base station (eNodeB or eNB), the base station often does not fine-tune the number of repetitions used as it might not have accurate visibility of the UE's channel conditions, and further, scheduled repetitions are available in a power of two and thus hard to tune exactly owing to needing to schedule the next largest power of 2 to meet requirements.

As would be understood, the TDC is typically provided in a dedicated hardware block with high power consumption. This is due to the fact that complex operations are performed, specifically 16 maximum a posteriori probability (MAP) decoding and interleaving for each separate decode operation. However, the TDC hardware block can be bypassed to save power. As a result, the UE receiver's strategy on when to launch the TDC has an important impact on power consumption of the receiver.

Although the issue of power saving and early PDSCH decoding has been considered before, the state of the art is vague when it comes to specifying a metric to use for this purpose.

A power-saving technique has been provided for early termination of decoding of the control channel (MPDCCH) and/or the data channel (PDSCH), applicable for Cat-M UEs. The solution is based on monitoring the channel quality at the receiver, using for example the SNR as a metric. If the UE fails to decode the channel after receiving a subset of the total repetitions, and if the channel quality metric is below a certain threshold, then the UE can stop the reception of the remaining repetitions and switch to low power mode.

The above approach only focuses on power saving by early termination of the decoding. With such an approach, there is a risk of missing a validly received packet due to the inherent stochastic properties of the wireless channel, especially if channel quality improves during the reception of data packets sent with a large number of repetitions.

Accordingly, there is a need for a method and system to improve the power efficiency of decoding repeated data at a receiver which is applicable to any communication scheme, and hence not just LTE Cat-M devices of the background example.

SUMMARY

According to a first aspect there is provided a method for receiving repeated transmission of portions of data from a transmitter as defined in Claim 1 of the appended claims.

Thus, there is provided a method for receiving repeated transmission of portions of data from a transmitter, the method comprising:
  at a processor of a receiver, deriving a metric indicative of a desired PER of the received repeated portions of data at the receiver;
  based on the desired PER of the received repeated portions of data at the receiver deriving an optimal number of repetitions of each portion of the data to be received for successful decoding, wherein when the optimal number of repetitions have been received, decoding is to be activated; and further wherein
  the optimal number of repetitions is derived such that power consumption to successfully decode the data is minimized at the receiver.

Optionally, the method wherein the receiver is configured to monitor the channel quality between the transmitter and the receiver.

Optionally, the method wherein repeated transmissions comprise sub-frames of data.

Optionally, the method wherein the optimal number of repetitions is derivable from a limited set of number of repetitions.

Optionally, the method further comprising receiving the optimal number of repetitions of each portion of data and then activating decoding at the receiver.

Optionally, the method further comprising deactivating the decoding when the data is successfully decoded.

Optionally, the method wherein the deriving a metric comprises deriving a channel metric.

Optionally, the method wherein the channel metric is derived from at least one of channel quality indicator, CQI, channel SNR, channel mutual information, MI, and channel spectral efficiency.

Optionally, the method wherein the channel metric is derived after each repeated data portion.

Optionally, the method wherein deriving the optimal number of repetitions of each portion of data is further based on comparing the channel metric to a pre-determined threshold indicative of the desired PER.

Optionally, the method wherein the pre-determined threshold is calculated for each respective number of repetitions under consideration.

Optionally, the method wherein the optimal number of repetitions is derived for each transmission modulation scheme under consideration.

Optionally, the method wherein the deriving an optimal number of repetitions of each portion of the data to be received is further based on the power consumed by the receiver to successfully combine and decode each portion of data, and where in metric is derived from the probability of successfully decoding by a defined number of repetitions of each portion of data.

Optionally, the method wherein the metric indicative of a desired PER is based on a ratio of the power used to decode each portion of data at the receiver to the power used to combine each portion of data at the receiver.

Optionally, the method wherein the metric indicative of a desired PER is re-estimated every K packets of received data or every period, T, of time.

According to a second aspect there is provided a non-transitory computer readable medium as defined in claim 16.

Thus, there is provided non-transitory computer readable medium comprising instructions that when executed by a processor cause the processor to carry out the method of the first aspect and any of its optional features.

According to a third aspect there is provided a configured to receive repeated transmissions of portions of data from a transmitter as defined in claim 17.

Thus, there is provided a receiver configured to receive repeated transmissions of portions of data from a transmitter, the receiver comprising a processor configured to execute computer code instructions to carry out the method of the first aspect and any of its optional features.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

Overview

Herein disclosed is a method and system for use with any type of telecommunications systems where the useful data is transmitted repeatedly by the transmitter (for example a base station) over a certain time duration, and where the receiver (for example a UE) uses a combining mechanism and a decoder to decode the received data.

The main illustrative embodiments are provided in the context of the LTE Cat-M standard.

In contrast to known systems and methods, a dynamic mechanism for the decoding of repeated data is provided whereby a decoder is activated and deactivated at optimum times for increased power efficiency at a receiver.

Moreover, it is possible to continue decoding the receive channel up until the final received repetition, if needed.

As will be explained, the optimal number of received repeated portions of data (for example subframes needed for PDSCH decoding) is chosen such that the receiver of a user equipment (UE) can select the optimal time for both activating and de-activating its decoder (to help with reducing power consumption of decoder hardware and also reducing RF power consumption). This leads to a power saving at the receiver. The disclosed method and system will typically be employed where a transmitter does not have access to an accurate estimation of the channel between it and a receiver and/or where the transmitter has a limited set of the number of repetitions that may be used. Two differing scenarios of fast varying and slow varying channel conditions are considered. In each scenario, the optimal time in terms of after how many received portions of data to turn on the decoder is dependent on a desired PER of received data and the receiver implementation. In the slow varying channel case, the probability of decoding successfully is used as well as the ratio of combining to decoding power consumption. In the fast varying channel case, a threshold based on decoding performance is used. For both of the probability of decoding and the threshold, the UE RF and baseband implementation is relevant.

As would be understood and known, a typical UE comprises a processor, associated memory and transmitter/receiver baseband and RF components.

DETAILED DESCRIPTION

Figure 1:
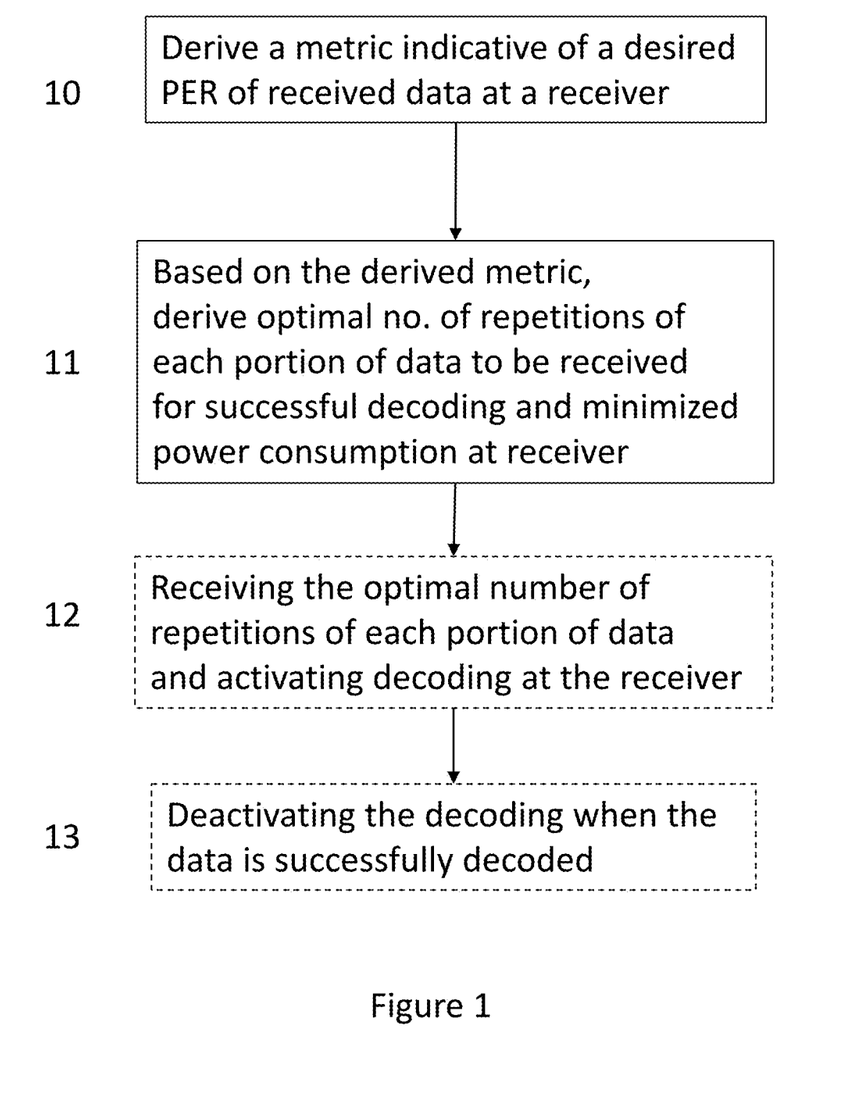
FIG. 1 illustrates a method according to an embodiment.

Turning to FIG. 1, a method according to an embodiment is disclosed. This method applies to any type communication system using repeated transmission of portions of data between a transmitter and a receiver.

At step 10, a processor of the receiver derives a metric indicative of a desired PER of the received repeated portions of data at the receiver. At step 11, based on the derived metric, an optimal number of repetitions of each portion of the data to be received for successful decoding is derived, wherein when the optimal number of repetitions have been received, decoding is to be initiated. Further, the optimal number of repetitions is derived such that power consumption to successfully decode the data is minimized at the receiver. In optional step 12, when the optimal number of repetitions of data has been received, decoding of the data begins at the receiver, and in optional step 13, decoding is stopped when the data has been successfully decoded.

There now follows a description of embodiments of an LTE-Cat M communications system for both a fast varying channel and a slow varying channel between transmitter and receiver.

Figure 2:
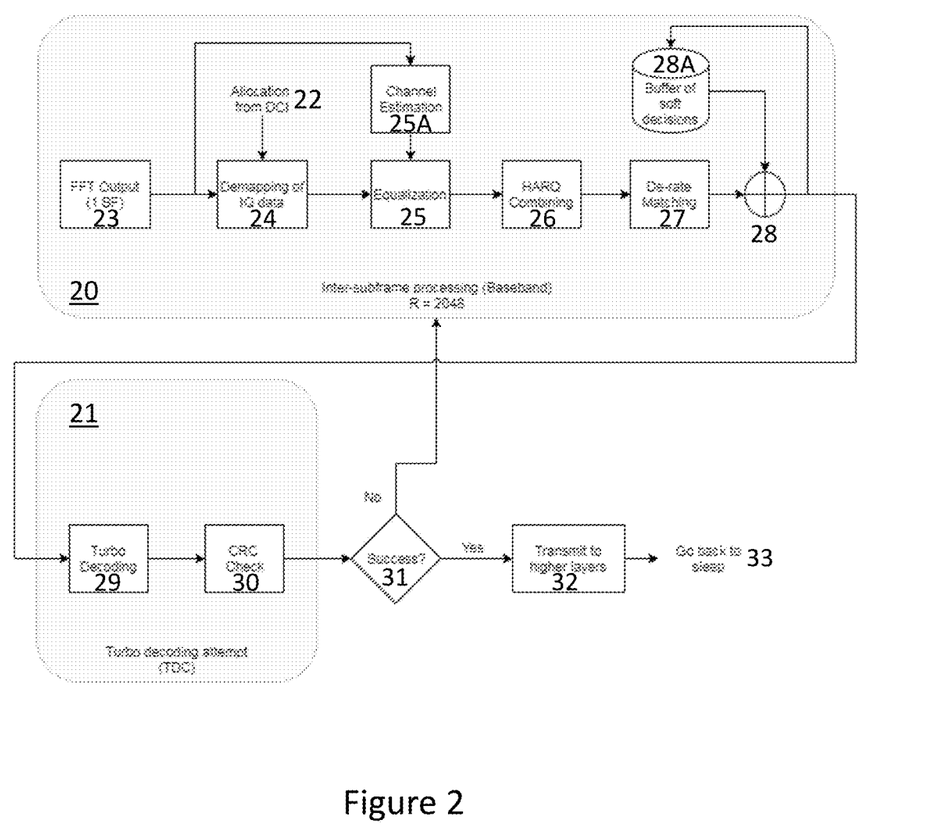
FIG. 2 illustrates a typical PDSCH decoder for an LTE CAT-M UE receiver.

FIG. 2 shows a typical PDSCH decoder for an LTE CAT-M UE receiver. FIG. 2 is split into two main blocks, the inter-subframe processing (base band) block 20 and the TDC block 21.

For LTE Cat-M devices, the UE attempts to decode Downlink Control Information 22 (DCI), which is received via the MPDCCH channel. If successful, the DCI indicates the downlink allocation of up to 6 resource blocks where data on the PDSCH channel will be transmitted, along with the number of repetitions sent by the eNB. For CEModeA the maximum number of repetitions is 32 while for CEModeB, the maximum number is 2048.

Since LTE uses Orthogonal Frequency Division Multiple Access (OFDMA) as a multiple access technique, a Fast Fourier Transform (FFT) is done on the received data to begin with (23). This is followed by a demapping of the received Inphase and Quadrature (IQ) PDSCH symbols (24). The result, combined with the channel estimation done on pilot symbols (25A), allows the recovery of the data initially encoded by the transmitter via equalization (25), where the output is often in the form of Log-Likelihood Ratio (LLR) elements. At this point, for each received sub-frame (SF), the UE performs inter-sub-frame soft-decision combining (28, 28A) as would be understood after hybrid automatic repeat request (HARQ) combining 26 and de-rate matching 27. The fundamental idea behind the gain in combining is the coherent accumulation of the transmitted symbols on one hand, and the reduction of additive Gaussian noise variance due to out-of-phase combining on the other hand.

The UE may select when to launch its Turbo decoder 29 and perform a CRC check 30. The earlier this is performed, if successful 31, the earlier the data is available to where it needs to go, for example higher software layers 32, after which the UE can go back to sleep 33. However, since the TDC consumes energy, attempting to decode too early comes at the expense of increased power consumption.

Prior knowledge of the UE's probability of decoding for different repetitions can help make better informed decisions on when to begin turbo decoding, especially for slowly varying channels as will be shown.

Figure 3:
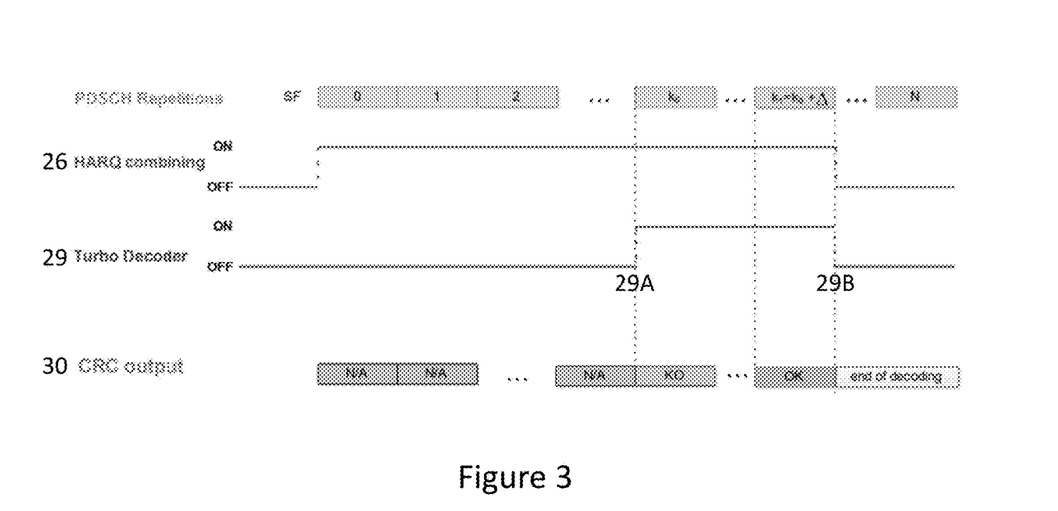
FIG. 3 illustrates optimal PDSCH decoding start time according to an embodiment for lower power consumption/PDSCH processing with prior notion of optimal repetition level $k_0$.

From FIG. 3 it can be seen that for reception of sub-frames 0 to N at a receiver, TDC 29 is activated 29A when sub-frame $k_0$ is received. The PDSCH is perfectly decoded 29B after the reception of sub-frame $k_1 = k_0 + \Delta$, where $\Delta$ is the number of decoding attempts until successful decoding. The algorithm can be configured such that it ensures $\Delta$ is as small as possible.

This scheme equally applies to any communication system utilizing repetition of portions of data, where portions other than sub-frames may be utilized.

Determining (at step 11) the optimal number of repetitions $k_0$ needed for PDSCH decoding allows the UE to select the exact time to start (step 12) the TDC decoder and perform CRC check. For optimal power saving, this timing can be selected such that it also minimizes the duration of keeping the RF active. For example, $k_0$ can be chosen to include a margin for decoding early; this avoids launching the decoder too late and incurring additional power consumption.

One important factor to consider is the coherence time of the channel. A channel is considered slowly varying (higher coherence) if the channel state stays fixed across a large time duration, otherwise a channel is considered fast varying. In general, coherence time is inversely proportional to Doppler shift Fd, which itself is proportional to the receiver's speed of travel. As a rule of thumb, coherence time $\sim 1/(2 \cdot Fd)$.

Embodiments catering for these two types of fading channels are considered below.

For illustration purposes, LTE Cat-M is used as an example. As would be understood, coverage enhancement mode A (CEModeA) and coverage enhancement mode B (CEModeB) inherently correspond to applications with fast and slow varying channel conditions respectively. Where SFs are mentioned in the below examples, this can equally apply to each 'repeated data portion' when considering other communication schemes that utilize repeated data.

Fast Varying Channels

The following example is based on an LTE Cat-M1 UE (1.4 MHz bandwidth) in CEModeA. This is also equally as relevant for higher-bandwidth Cat-M2 UEs (5 MHz), and any other communication scheme using repetition to transmit data to a receiver. In this example it is assumed that:

1. The transmitter (for example a base station or eNB) sends control data and useful data over specific channels with a pre-defined level of repetitions N (for example a band limited (BL)/coverage enhanced (CE) UE working in CE Mode A can be scheduled with no repetitions or with up to 32 repetitions: $N \in \{1,2,4,8,16,32\}$). This is a limited set of number of repetitions. For other communication systems, a free-choice of the number of repetitions may be available.
2. A channel metric may be used which may be derived from channel quality measurements made by the UE (for example a BL/CE UE working in CEModeA can use channel quality indicator (CQI) reports as a way of assessing the channel quality at the UE side. The UE is required to monitor the channel between the transmitter (eNB, base station) and itself, and asses its quality by converting it into a CQI index from 0 to 10, according to the CQI definition in the 3GPP standard.

Further details of deriving a channel metric for a fast varying channel are now described. A BL/CE UE working in CEModeA monitors the channel quality over a group of time and frequency channel state information (CSI) reference resources, that includes up to $R^{CSI}$ consecutive, valid BL/CE downlink or special sub-frames. For a periodic report, the UE will always monitor $R^{CSI}$ consecutive, valid BL/CE downlink or special sub-frames (portion of data) on each narrow-band where MPDCCH is being monitored.

The value of $R^{CSI}$ is given by the higher layer parameter csi-NumRepetitionCE and according to the 3GPP standard $R^{CSI} \in \{1,2,4,8,16,32\}$.

In order to compute an accurate CQI, over the entire CSI resource, the UE generally stores channel information from each of the $R^{CSI}$ SFs it monitors. This information can be SNR measures, spectral efficiency, mutual information or any other metric implemented in the UE, and it is only used to compute the CQI report every $R^{CSI}$ SFs. This means that for a number of $R^{CSI}-1$ SFs, this data remains available and unused information which can be used after every subframe received within the ($R^{CSI}-1$) subframes. That is to say after every repeated data portion in terms of other data repetition communication schemes.

This available channel metric information can be used in real time in order to derive (step 11) after how many repetition sub-frames ($k_0$) the UE should start decoding the received PDSCH data.

$k_0$ can be determined and tuned by imposing a desired packet error rate (PER) it is desired to obtain when first decoding the received PDSCH data.

In order to avoid power consumption by keeping the RF of the receiver active any longer than necessary, the target PER is preferably set higher than the CQI target PER of 0.1. Preferably, a target PER value in the range 0.3 to 0.7 should be considered.

The general mechanism behind computing a CQI report, comprises measuring a metric of the channel quality over a number of $R^{CSI}$ SF (for example SNR, MI, Spectral Efficiency, etc) and comparing this channel metric to one or more pre-determined thresholds ($T_n$, with n being the number of SFs n∈{1 . . . 32}) obtained based on the UE PDSCH decoding performance with the same number of PDSCH repetition. The thresholds are indicative of a desired PER of the received data.

Generally, these thresholds are pre-determined and stored only for the discrete set of repetitions defined by the standard {1,2,4,8,16,32}. However, for use with other communication schemes, they may be extended to any value of repetitions between 1 and 32 since it does not involve real-time computations and only pre-determined, constant values.

With thresholds corresponding to the targeted PDSCH decoding PER available for any number of SFs, as soon as one SF has been measured for CQI, the UE can use the corresponding CQI metric and compare it to the pre-determined threshold. If it passes the threshold, the UE can assume that it would reach the target PER for PDSCH decoding with the repetition level corresponding to the number of received SF. If not, the UE continues updating the metric and comparing it to the appropriate thresholds for all the next SF until the threshold is surpassed.

Having determined the minimum number of PDSCH sub-frames ($k_0$) necessary for accurate decoding, the UE can decode PDSCH as soon as it receives the $k_0$-th sub-frame (29A), and go into a low power mode after that (29B) as shown in FIG. 3.

In summary, a method for fast varying channels with reference to the method of FIG. 1:

Step F0: Initialize $k_0$=0 and n=0
[step 10 of FIG. 1]
Step F1: Measure Channel quality over the 'n' available SF (where MPDCCH is monitored, n>=1)
Derive CQI metric X (effective SNR, MI, Spectral Efficiency, etc)
Step F2: derive thresholds indicative of a desired PER of received data
[step 11 of FIG. 1]
Step F3: Compare CQI metric X to thresholds for "n" SF($T_n$)
If X>$T_n$:
  $k_0$=n
  Stop algorithm until PDSCH transmission starts, then go to step F4
  Store $k_0$ value
If X<$T_n$:
  wait to receive SF n+1
  n←n+1;
  go to step F1
[step 12 of FIG. 1]
Step F4: Start receiving PDSCH transmission but postpone activating decoding for $k_0$ SFs
Upon reception of the $k_0$-th PDSCH SF activate decoding PDSCH (29A)
[step 13 of FIG. 1]
Step F5: when PDSCH is decoded (CRC OK), stop PDSCH decoding (29B) and enter low power mode (33).

Figure 4:
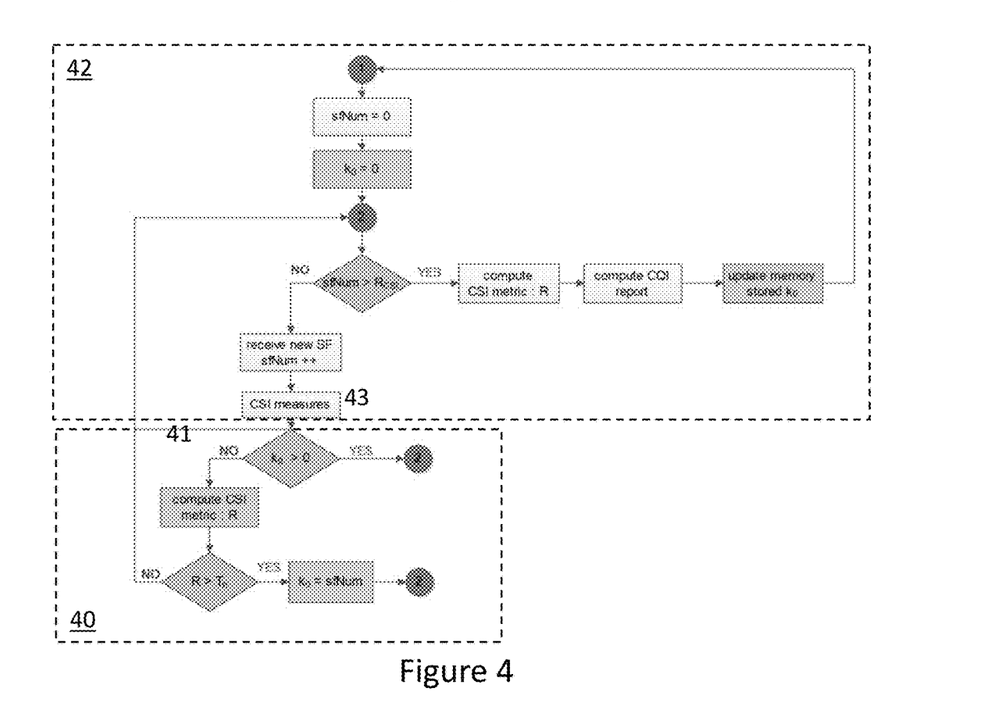
FIG. 4 illustrates a new CQI process according to an embodiment.

As shown on FIG. 4, additions required (40) for the estimation of the optimal number of PDSCH repetitions over typical CQI processing (42) are minimal. Furthermore, once $k_0$ has been determined, the additional processing block 40 can be stopped where the output from CSI measures 43 returns to '2' by following line 41.

Further, at the time that CSI measures are done, the UE has no information on the scheduled modulation coding scheme (MCS) value, therefore a $k_0$ value preferably needs to be computed for all possible MCS. However, this requires only comparison of the CSI Metric (R) with a different threshold per MCS, and all comparisons can be parallelized as would be understood.

Once the value of $k_0$ has been estimated, it is stored in memory at the receiver and used for selecting the optimal moment (in terms of number of repetition SFs) for PDSCH decoding as shown previously in FIG. 3.

Slow Varying Channels

For slow varying channels, the decoder at the UE is activated as a function of the probability of successfully decoding the transmitted portions of data. Again, the example is based on LTE Cat-M1 CEModeB applications where the wireless channel is static across time (a slow varying channel). In the same manner as the fast varying channel example, the strategy can be extended to higher-bandwidth UEs with repetitions, such as Cat-M2 occupying a bandwidth of 5 MHz, and any other communications strategy using repetition to transmit data to a receiver.

Figure 5:
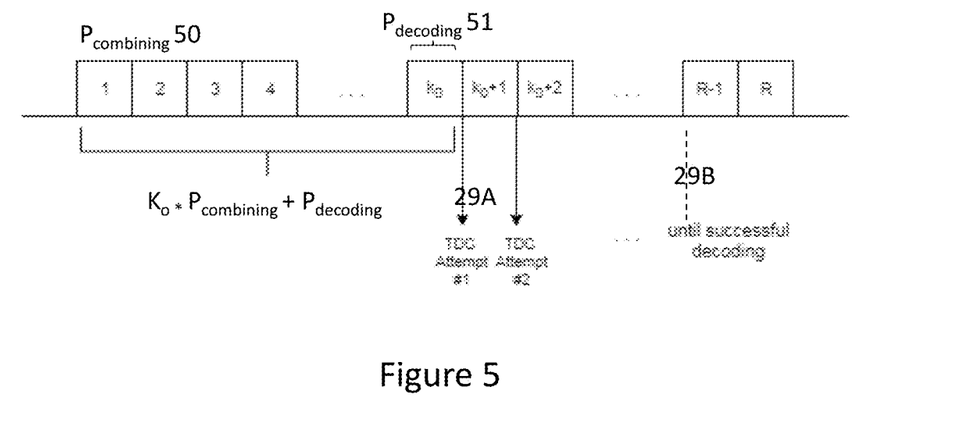
FIG. 5 illustrates a decoding strategy according to an embodiment.

Turning to FIG. 5, let R be the number of repetitions transmitted by the transmitter (eNB, base station). Let $P_{combining}$ 50 be the power consumed by the UE RF and baseband inter-subframe soft-decision combining (see 20 in FIG. 2) in a single subframe, and $P_{decoding}$ 51 be the power consumed by a single decoding attempt (see 21 in FIG. 2, including CRC check.

The same scheme is employed as that shown in FIG. 3, that is to activate 29A the (turbo) decoder after the reception of repetition $k_0$, and for all repetitions received thereafter until successful decoding is indicated by a positive CRC check 29B.

Let $k_1$ be the actual received repetition at which the (turbo) decoder is successful, where $k_0 \leq k_1 \leq R$. A cost function is defined as the total power consumed, as a function of $k_0$ and $k_1$:

$$C(k_0,k_1)=k_0 \times P_{combining}+P_{decoding}+(P_{combining}+P_{decoding}) \times (k_1-k_0) \quad [1]$$

In practice, the value $k_1$ depends on the probability of decoding which itself is dependent on the channel conditions (a channel metric) between transmitter and receiver.

Let Π(k) be the probability density function representing probability of decoding after exactly k repetitions, where $$\sum_{k=1}^{R} \Pi(k) = 1.$$

The average total power consumed can be calculated as a function of $k_0$:

$$\hat{C}(k_0) = E[C(k_0, k_1) | k_0] \quad [2]$$

$$= k_0 \times P_{BB} + P_{TDC} + \sum_{k_1 > k_0}^{R} \Pi(k_1)(P_{combining} + P_{decoding}) \times (k_1 - k_0)$$

where the averaging is done on random variable $k_1$ by way of fixing the value of k0 (the time at which the decoder is activated) in the above equation and find the average power consumed for all possible k1 (the time at which the decoding is actually successful).

The most efficient decoding at the receiver is carried out at the ideal value $\hat{k}_0$ which minimizes the above cost function.

To this end, the problem is translated into the continuous domain where the derivative is calculated and solved for the minimizer. In the continuous domain, the cost function becomes:

$$\hat{C}(t_0) = E[C(t_0, t_1)|t_0] = t_0 \times P_{combining} + P_{decoding} + \int_{t_1=t_0}^{R} \Pi(t_1)(P_{combining} + P_{decoding}) \times (t_1 - t_0) dt_1$$

where the variable k is replaced with t to distinguish the discrete from continuous domains, and the sum is replaced by an integral.

Then, we solve for:

$$\frac{\delta \hat{C}(t_0)}{\delta t_0} = P_{combining} + (P_{combining} + P_{decoding}) \times \frac{\delta}{\delta t}$$

$$\int_{t_1=t_0}^{R} t_1 \times \Pi(t_1) dt_1 -$$

$$t_0 \int_{t_1=t_0}^{R} \Pi(t_1) dt_1$$

$$= 0$$

Using Leibniz's rule for differentiation:

$$\frac{\delta \hat{C}(t_0)}{\delta t_0} = P_{combining} - (P_{combining} + P_{deecoding}) \int_{t_1=t_0}^{R} \Pi(t_1) dt_1$$

$$= P_{combining} - (P_{combining} + P_{deecoding}) f(t_0)$$

$$= 0$$

where $$f(t_0) = \int_{t_1=t_0}^{R} \Pi(t_1) dt_1.$$

Moving back to the discrete domain, we would like to solve for:

$$P_{combining} - (P_{combining} + P_{deecoding}) f(k_0) = 0 \quad [3]$$

where $$f(k_0) = \sum_{k_1 > k_0}^{R} \Pi(k_1) f(k_0) = \sum_{k_1 > k_0}^{R} \Pi(k_1)$$

and represents the probability of not decoding before repetition ($k_0$+1).

Hence, the minimizer $\hat{k}_0$ is the value which ensures $$f(\hat{k}_0) = \frac{P_{combing}}{P_{combining} + P_{decoding}} = \frac{1}{1+\alpha} \quad [4]$$

where $$\alpha = \frac{P_{decoding}}{P_{combining}}$$

is the ratio of decoding to inter-subframe combining (RF+baseband) power consumption.

In essence, $f(k_0)$ [equation 3] can be thought of as a metric indicative of the packet error rate (PER), also known as block error rate (BLER), for a given repetition number $k_0$. This is a decreasing function of $k_0$ whose slope is steeper the better the channel conditions. On the other hand, the entity $$\frac{1}{1+\alpha}$$

is a horizontal line which moves upwards the cheaper the cost of a single turbo decoding attempt ($\alpha \ll 1$) and downwards whenever the cost of a TDC grows large ($\alpha \gg 1$). The intersection of these two curves yields the optimal value $\hat{k}_0$.

In practice, the UE estimates f(k), defined as the packet error rate (PER) for a given repetition number k, for all $k \in \{1, \ldots, R\}$. For a slow varying channel example R is expected to be fixed by the transmitter (eNB, base station). This could be the case for a classical smart meter application with fixed deployment of devices.

The initial estimation of f(k) can be obtained by tracking N successive received packets. For each successful reception of a packet at repetition k, a counter of non-detection is incremented by 1 (initialized to zero) for all repetitions up to k−1. After N received packets, a normalization of all counters by N yields f(k). The choice of N can be made such that a reliable PER estimate can be made at $10^{-1}$ or $10^{-2}$, so a value in the order of 100 or 1000 is sufficient.

In practice we can decide to down sample the value of k start with a multiple of e.g. 16, and then refine the zones that need to be refined (i.e. where f is not 0 nor 1). We can also down sample and interpolate the sparse measures. In other words, f(k) does not have to be calculated for all values of k. This can save on implementation complexity. f(k) can be calculated for different multiples of k, say: 1, 16, 32, etc. From there, using linear or polynomial interpolation, f(k) can be approximated for values in between.

Once f(k) is estimated, knowing the ratio $$\alpha = \frac{P_{decoding}}{P_{combining}}$$

of power consumption between the turbo decoding 21 and RF/baseband processing 20, the UE can perform a search in f(k) to find the closest value to $$\frac{1}{1+\alpha}$$

whose index corresponds to the minimizer $k_0$. A search algorithm may be a binary search which exploits the fact that f(k) is inherently sorted. For the subsequent packet, the UE can perform inter-subframe combining over $k_0$ subframes before launching the decoding stage. Knowing that RF consumption can be high, the UE can start the decoding slightly early before $k_0$ k* as well in order to decode and turn off the RF as soon as possible.

Note that the re-initialization and re-estimation of f(k) can be triggered with a period T, where T can be in the order of seconds, minutes, or even hours.

Another option is to do this every K packets by, for example, performing an exponential averaging with one re-estimation every K packets.

Moreover, for static channel conditions the minimizer would be somewhere around $k_0$ because when $k_0$ is estimated at a given point in time, if the channel is slowly varying the optimal $k_0$ is not expected to drift too much. Hence, when re-estimating $k_0$, the search range can be limited around the previous $k_0$ in order to reduce algorithm complexity.

Therefore, f(k) can be updated in a window 2W centered around $k_0$. As a result, the (turbo) decoder can be activated starting at repetition ($k_0$−W) (slightly early as previously mentioned) rather than the first repetition. W can be chosen as a fraction of R, for example 10%.

Further, the 3GPP standard allows narrowband hopping. This feature may be enabled to enhance performance and can have an impact on the shape of f(k), and hence on the minimizer $k_0$, compared to the case where hopping is disabled. The UE may keep two contexts. One for when narrowband hopping is disabled, and another for when it is enabled. For the former case, f(k) would represent a PER averaged over all scheduled narrowbands (fixed), while for the latter it would incorporate the gains of frequency diversity obtained via hopping, which is what we desire. Depending on the configuration signalled in the MPDCCH allocation, the UE can then fetch the correct context before the start of PDSCH decoding.

In summary, a method (in pseudo code) for slow varying channels with reference to the method of FIG. 1:
Initialization:
Allocate array f(k)=0 for all k∈{1, . . . ,R}, where R is the number of repetitions signalled in the DCI allocation
Choose N, the number of packets used for the estimation of f(k)
Choose T, the period at which a re-estimation of f(k) is triggered
Pre-calculate $$N \times \frac{1}{1+\alpha},$$

where $$\alpha = \frac{P_{decoding}}{P_{combining}}$$

(Optional) Choose W, the short search window to be used for subsequent estimations of k*
[step 10 of FIG. 1]
(f(k) depends on the probability of decoding which can be thought of as the PER for a given repetition number)
Step S1: Estimate f(k) as follows:

```
For (packet i received in {1,..,N})
    For (repetition r in {1,..,R})
        ■ Launch inter-subframe combining, followed by decoding
        If (CRC is OK) or (r == R)
            f (k) = f (k) + 1 for k in {1,..,r − 1})
            Break
        End
    End
End
Note that here, f (k) is not normalized by N.
```

[step 11 of FIG. 1]
Step S2: Using binary search, find the closest element to $$N \times \frac{1}{1+\alpha} \ln(k).$$

The corresponding index in the array is the minimizer $k_0$
[steps 12 and 13 of FIG. 1]

Step S3: For each subsequently received PDSCH packet within period T:

```
For each repetition r in {1,..,R}, launch inter-subframe combining
    If r ≥ k_0
        Activate the decoder
            If (CRC is OK), de-activate the decoder
        End
    End
End
```

Optional step S4:
Once a time period T has elapsed, reset f(k) to zero and go back to step 1.
Another option is to keep the existing value and refine it, e.g. through exponential averaging. An optional optimization is to apply step 1 only on a window k∈{$k_0$−W, . . . ,$k_0$+W}.
Similarly, step 2 can be carried out over this window only. However, if the minimizer cannot be found in this window, i.e., $$N \times \frac{1}{1+\alpha} < f(k_0 - W) \text{ or}$$

$$N \times \frac{1}{1+\alpha} > f(k_0 + W),$$

then go back to step 1 and restart from scratch with the initial window k∈{1, . . . , R}.

Validation for Slow Varying Channels

For Cat-M UEs operating in CEModeB, it can be assumed that channel conditions vary slowly due to very limited mobility. For systems where there is no mobility (for example smart meters), the channel variations are due to the variation in the environment or due to UE imperfections (for example phase noise). This translates to low doppler conditions, which is why a 1 Hz Doppler shift is used as reference. Moreover, we choose an Extended Typical Urban (ETU) channel model which is characterized by a large delay spread and represents accurately the dense urban environments encountered in typical LTE systems.

The probability of decoding Π(k) as a function of repetition level, using R=64 repetitions as an example. Two use cases are considered at different levels of signal to noise ratio (SNR), such that (unfavorable) $SNR_1 < SNR_2$ (favorable).

Figure 6A:
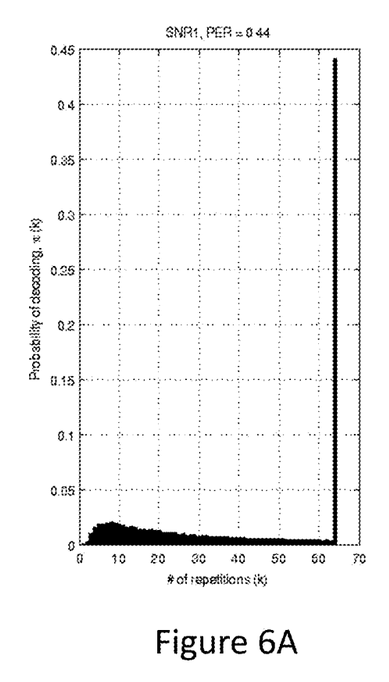
FIG. 6A illustrates probability of decoding in unfavorable channel conditions.
Figure 6B:
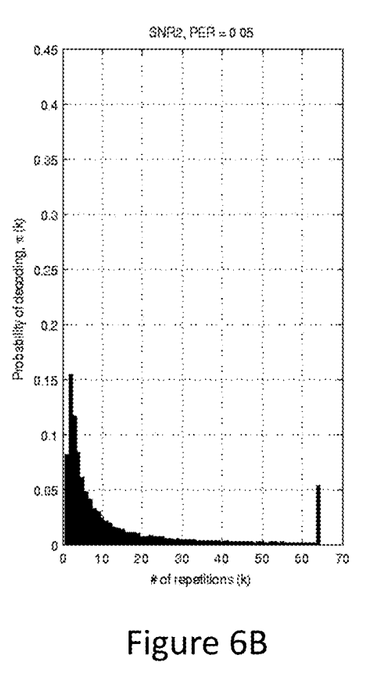
FIG. 6B illustrates probability of decoding in favorable channel conditions.

The resulting probabilities are illustrated in FIGS. 6A (unfavorable channel conditions) and 6B (favorable channel conditions).

In FIG. 6A (SNR1 unfavorable) it is observed that the transmitter (eNB, base station) under-dimensioned the number of repetitions with respect to the UE's perceived SNR, whereas they were over-dimensioned in FIG. 6B (SNR2 favorable). Both use cases can occur in practice as the eNB does not necessarily fine-tune the repetition level as a function of the UE's channel conditions, especially since the repetitions are scheduled in powers of two.

Figure 7A:
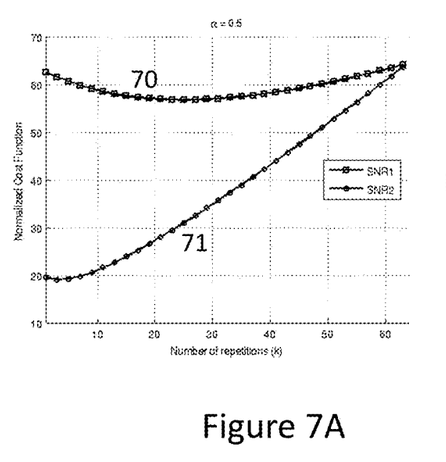
FIG. 7A illustrates cost function vs. number of repetitions.

In FIG. 7A, the cost function is plotted for both channel conditions (unfavorable 70 and favorable 71) using equation (1), taking $P_{combining}$=1 and $P_{decoding}$=0.5 ($\alpha$=0.5). It is first normalized by $P_{combining}$ where it becomes a function of $\alpha$:

$$\hat{C}_{norm}(k_0) = k_0 + \alpha + \sum_{k_1 > k_0}^{R} \Pi(k_1)(1+\alpha) \times (k_1 - k_0)$$

The 'minimum' point of each curve represents the lowest cost and hence the optimal $k_0$. We see that $k_0 0 = 25$ for the favorable SNR curve 71 $k_0 = 3$ for the unfavorable SNR curve 70.

Figure 7B:
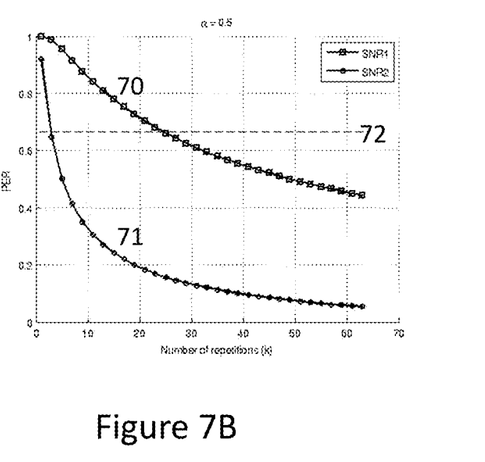
FIG. 7B illustrates finding the minimizer using derived method.

In FIG. 7B, the minimizer is provided using the derived method in equation (4) as the intersection between the curves $f(k_0)$ and $$\frac{1}{1+\alpha},$$

where the latter is represented as the black dotted line 72. The minimizer for the two use cases (unfavorable SNR 70, favorable SNR 71) can be seen to be $\hat{k}_0 = 25$ and $\hat{k}_0 = 3$ respectively in both left and right plots of FIG. 7, hence validating our derived equation.

Moreover, it is observed that for favorable channel conditions (SNR2 71), the cost of decoding is much lower than in unfavorable channel conditions (SNR1 72) for smaller repetition numbers. This is because the probability of decoding early is much higher in the favorable case. In the unfavorable case, the method indicates to wait almost halfway through the total repetitions before launching the (turbo) decoder.

The obtained cost functions were also validated using the monte-carlo method: for a given $k_0$, sample the cumulative distribution function (CDF), obtained by integrating $\Pi(k)$, to find the repetition $k_1$ at which we successfully decode. Repeating this over a large number of samples, we can compute the average power consumed as a function of $k_0$.

To illustrate the power efficiency gain provided by the disclosed method, performance is evaluated of the following three decoding strategies:
1. Early decode: activate the decoder from the start, i.e., $k_0 = 1$. The UE only stops once it successfully decodes (CRC check is OK) or it reaches the end of the repetitions.
2. Late decode: activate the decoder only at the end, i.e., $k_0 = R$.
3. Optimal: use the derived method to find $\hat{k}_0$ based on equation (4)

Figure 8A:
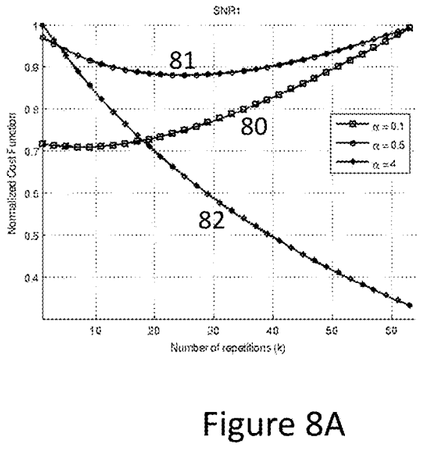
FIG. 8A illustrates average cost functions for different values of alpha in unfavorable SNR conditions.
Figure 8B:
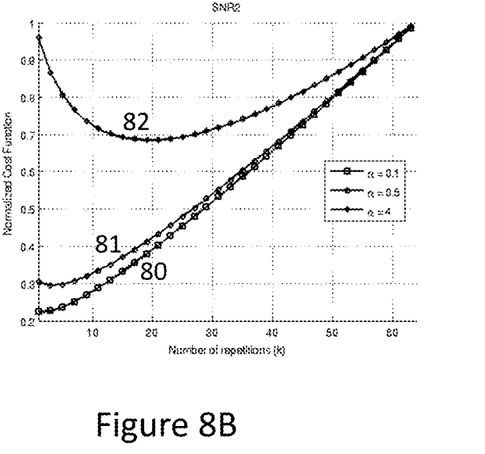
FIG. 8B illustrates average cost functions for different values of alpha in favorable SNR conditions.

Also, three different ratios of decoding-to-baseband power consumption ($\alpha$) of equation (4) are considered.
1. Cheap decoding: $\alpha = 0.1$ (curve 80)
   We assume that the turbo decoder implementation is optimized compared to baseband processing, where blocks such as channel estimation 25A and equalization 25 are the bottlenecks.
2. Balanced: $\alpha = 0.5$ (curve 81)
   Here, it is assumed that RF and baseband processing have been optimized, bringing their power consumption close to the often complex turbo decoder implementations.
3. Expensive decoding: $\alpha = 4$ (curve 82)
   A possible use case where decoding can be more power hungry than RF, and baseband processing is in I/Q combining implementations. Here, the order of operations is modified. In baseband, we only combine output FFT samples 23 in the I/Q domain, which assumes that the channel is static in time. In the decoding stage we perform the channel estimation 25A, equalization 25, turbo decoding 29, etc.

Indeed, a better naming convention for baseband inter-subframe combining and decoding would now be I/Q combining and I/Q decoding, respectively.

FIG. 8A shows the average cost functions for the same unfavorable SNR1 of FIGS. 6 and 7. FIG. 8B shows the average cost functions for the same favorable SNR2 of FIGS. 6 and 7. In FIGS. 8A and 8B, the curves have normalized each by the maximum value, $$\max_k \hat{C}(k),$$

in order to render the scales homogenous and to assess performance gains more easily.

The performance gains of using the derived strategy, in % power consumption savings, are summarized in the table below.

| | SNR1 (unfavorable) | | | SNR2 (favorable) | | |
|---|---|---|---|---|---|---|
| | $\alpha = 0.1$ | $\alpha = 0.5$ | $\alpha = 4$ | $\alpha = 0.1$ | $\alpha = 0.5$ | $\alpha = 4$ |
| Worst-case Performance Improvement (Optimal Decode) | Late decode 30% | Early/Late decode 10-12% | Early decode 68% | Late decode 78% | 70% | 32% |

This disclosure illustrates the reduction of UE power consumption by choosing the optimal time in terms of decoding capabilities to start and stop decoding in relation to the number of data repetitions received.

The disclosure allows minimized power consumption when decoding a data channel, especially during low power mode cycles.

Benefits provided include:
Automatic power consumption optimization adapted for fixed devices in very low SNR conditions (for example smart meters)
Low complexity of implementation The various methods described above may be implemented by a computer program product. The computer program product may include computer code arranged to instruct a computer or processor to perform the functions of one or more of the various methods described above. The computer program and/or the code for performing such methods may be provided to an apparatus, such as a computer or a processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or processor may be configured in accordance with such code to perform one or more processes in accordance with the various methods discussed herein. Such an apparatus may take the form of a

The invention claimed is:

1. A method for receiving repeated transmission of portions of data over a physical downlink shared channel from a transmitter, the method comprising:
    at a processor of a receiver comprising a decoder, deriving a channel metric indicative of channel quality between the transmitter and the receiver, wherein the channel metric is derived by measuring machine type communication (MTC) physical downlink control channel (MPDCCH) quality over one or more MPDCCH sub-frames during channel quality indicator (CQI) computation;
    deriving a metric indicative of a desired packet error rate (PER) of the repeated portions of data to be received over the physical downlink shared channel at the receiver;
    based on a comparison of (i) the channel metric derived from the MPDCCH quality measurements, and (ii) the desired PER of the repeated portions of data to be received over the physical downlink shared channel at the receiver, deriving an optimal number of repetitions of each portion of the data to be received over the physical downlink shared channel for successful decoding, wherein when the optimal number of repetitions have been received over the physical downlink shared channel, decoding is to be activated by activation of the decoder; and further wherein
    the optimal number of repetitions is derived such that power consumption to successfully decode the data is minimized at the receiver.

2. The method of claim 1 wherein the receiver is configured to monitor the channel quality between the transmitter and the receiver.

3. The method of claim 1 wherein repeated transmissions comprise sub-frames of data.

4. The method of claim 1 wherein the optimal number of repetitions is derivable from a limited set of number of repetitions.

5. The method of claim 1 further comprising receiving the optimal number of repetitions of each portion of data and then activating decoding at the receiver.

6. The method of claim 1 further comprising deactivating the decoding when the data is successfully decoded.

7. The method of claim 1 wherein the channel metric is derived from at least one of channel quality indicator, CQI, channel SNR, channel mutual information, MI, and channel spectral efficiency.

8. The method of claim 1 wherein the channel metric is derived after each repeated data portion.

9. The method of claim 1 wherein deriving the optimal number of repetitions of each portion of data is further based on comparing the channel metric to a pre-determined threshold indicative of the desired PER.

10. The method of claim 9 wherein the pre-determined threshold is calculated for each respective number of repetitions under consideration.

11. The method of claim 1 wherein the optimal number of repetitions is derived for each transmission modulation scheme under consideration.

12. A non-transitory computer readable medium comprising instructions that when executed by a processor cause the processor to carry out the method of claim 1.

13. A receiver configured to receive repeated transmissions of portions of data from a transmitter, the receiver comprising a processor configured to execute computer code instructions to carry out the method of claim 1.

14. A method for receiving repeated transmission of portions of data over a data channel from a transmitter, the method comprising:
    at a processor of a receiver comprising a decoder, deriving a metric indicative of an estimated packet error rate (PER) of the received repeated portions of data at the receiver;
    deriving a threshold based on a ratio of power consumed by the receiver to decode each portion of data at the receiver to power consumed by the receiver to combine each portion of data at the receiver;
    based on a comparison of the threshold and the estimated PER of the received repeated portions of data at the receiver, deriving an optimal number of repetitions of each portion of the data to be received for successful decoding, wherein when the optimal number of repetitions have been received, decoding is to be activated by activation of the decoder; and further wherein
    the optimal number of repetitions is derived such that power consumption to successfully decode the data is minimized at the receiver.

15. The method of claim 14 wherein the deriving an optimal number of repetitions of each portion of the data to be received is further based on the power consumed by the receiver to successfully combine and decode each portion of data, and wherein the metric is derived from the probability of successfully decoding by a defined number of repetitions of each portion of data.

16. The method of claim 14 wherein the metric indicative of the estimated PER is re-estimated every K packets of received data or every period, T, of time.

17. A non-transitory computer readable medium comprising instructions that when executed by a processor cause the processor to carry out the method of claim 14.

18. A receiver configured to receive repeated transmissions of portions of data from a transmitter, the receiver comprising a processor configured to execute computer code instructions to carry out the method of claim 14.

* * * * *